US010285417B2

(12) United States Patent
Cocchi et al.

(10) Patent No.: US 10,285,417 B2
(45) Date of Patent: May 14, 2019

(54) MACHINE AND METHOD FOR MAKING TWO LIQUID OR SEMI-LIQUID FOOD PRODUCTS

(71) Applicant: ALI S.p.A.-CARPIGIANI GROUP, Milan (IT)

(72) Inventors: Andrea Cocchi, Calderara di Reno (IT); Roberto Lazzarini, Reggio Emilia (IT)

(73) Assignee: ALI Group S.R.L.—Carpigiani, Cernusco Sul Naviglio (MI) (IT)

( * ) Notice: Subject to any disclaimer, the term of this patent is extended or adjusted under 35 U.S.C. 154(b) by 534 days.

(21) Appl. No.: 14/982,469

(22) Filed: Dec. 29, 2015

(65) Prior Publication Data
US 2016/0198734 A1 Jul. 14, 2016

(30) Foreign Application Priority Data

Jan. 9, 2015 (IT) ............................ BO2015A0004

(51) Int. Cl.
*A23G 9/08* (2006.01)
*A23G 9/12* (2006.01)
(Continued)

(52) U.S. Cl.
CPC .............. *A23G 9/12* (2013.01); *A23G 9/08* (2013.01); *A23G 9/228* (2013.01); *A23G 9/28* (2013.01)

(58) Field of Classification Search
CPC . A23G 9/08; A23G 9/12; A23G 9/228; A23G 9/28
See application file for complete search history.

(56) References Cited

U.S. PATENT DOCUMENTS 5,205,129 A 4/1993 Wright et al.
6,136,362 A * 10/2000 Ashton .................. A23C 7/02
134/169 R
(Continued)

FOREIGN PATENT DOCUMENTS

CA 2387219 A1 11/1999
EP 1353132 A2 10/2003
(Continued)

OTHER PUBLICATIONS

Italian Search Report dated Apr. 14, 2015 for counterpart Application No. IT BO20150004.

*Primary Examiner* — Tu B Hoang
*Assistant Examiner* — Vy T Nguyen
(74) *Attorney, Agent, or Firm* — Shuttleworth & Ingeroll, PLC; Timothy Klima

(57) ABSTRACT

A machine for simultaneously making first and second liquid or semi-liquid products includes a first stirrer operating on a first container and a second stirrer operating on a second container. A thermodynamic heat treatment system includes a circuit filled with a heat exchanger fluid, a compressor operating on the fluid, a first heat exchanger affected by the fluid to exchange heat with the first container, and a second heat exchanger affected by the fluid to exchange heat with the second container. A first device for adjusting the flow rate of the fluid allows adjustment of the thermal power exchanged by the first heat exchanger. A second device for adjusting the flow rate of the fluid allows adjustment of the thermal power exchanged by the second heat exchanger. A control unit controls the first and second devices as a function of a measured operating parameter of the machine.

17 Claims, 3 Drawing Sheets

(51) Int. Cl.
*A23G 9/22* (2006.01)
*A23G 9/28* (2006.01)

(56) References Cited

U.S. PATENT DOCUMENTS

| | | | | |
|---|---|---|---|---|
| 6,705,106 | B1* | 3/2004 | Cunha | A23G 9/045 222/146.6 |
| 7,152,765 | B1* | 12/2006 | Midden | A23G 9/045 222/511 |
| 7,712,321 | B2* | 5/2010 | Kadyk | A23G 9/045 62/136 |
| 9,516,889 | B2* | 12/2016 | Tuchrelo | A47J 31/60 |
| 10,015,976 | B2* | 7/2018 | Cocchi | A23G 9/228 |
| 2006/0054614 | A1* | 3/2006 | Baxter | A23G 9/045 219/400 |
| 2007/0062212 | A1* | 3/2007 | Frank | A23G 9/22 62/342 |
| 2007/0231440 | A1* | 10/2007 | Taketsuka | A23C 11/103 426/565 |
| 2009/0120306 | A1* | 5/2009 | DeCarlo | A23G 9/12 99/485 |
| 2009/0193828 | A1* | 8/2009 | Cocchi | A23G 9/22 62/222 |
| 2010/0058772 | A1* | 3/2010 | Russo | A23G 9/045 62/1 |
| 2010/0062128 | A1* | 3/2010 | Khoo | A23F 5/465 426/474 |
| 2011/0256617 | A1* | 10/2011 | Cocchi | G01N 33/48735 435/286.1 |
| 2011/0297272 | A1* | 12/2011 | Hammonds | A23G 9/045 141/1 |
| 2012/0017606 | A1* | 1/2012 | Cocchi | A23G 9/12 62/1 |
| 2012/0055189 | A1* | 3/2012 | Sipp | A23G 9/045 62/342 |
| 2012/0104046 | A1 | 5/2012 | Wadle et al. | |
| 2012/0217264 | A1* | 8/2012 | Cocchi | A23G 9/04 222/95 |
| 2012/0251697 | A1* | 10/2012 | Cocchi | A23G 9/045 426/521 |
| 2012/0312049 | A1* | 12/2012 | Downs, III | A23G 9/20 62/340 |
| 2013/0000338 | A1* | 1/2013 | Cocchi | F25B 1/10 62/190 |
| 2013/0269381 | A1* | 10/2013 | Cocchi | A23L 3/36 62/246 |
| 2013/0269540 | A1* | 10/2013 | Lazzarini | A23C 9/1223 99/455 |

FOREIGN PATENT DOCUMENTS

| | | |
|---|---|---|
| EP | 1415543 A2 | 5/2004 |
| EP | 2783574 A1 | 10/2014 |
| EP | 2805620 A1 | 11/2014 |

* cited by examiner

MACHINE AND METHOD FOR MAKING TWO LIQUID OR SEMI-LIQUID FOOD PRODUCTS

This application claims priority to Italian Patent Application BO2015A000004 filed Jan. 9, 2015, the entirety of which is incorporated by reference herein.

BACKGROUND OF THE INVENTION

This invention relates to a machine and a method for making (simultaneously) two different liquid or semi-liquid food products, that is to say, a machine and a method for making liquid or semi-liquid food products.

More specifically, this invention relates to an apparatus such as a batch freezer, a pasteurizer, a crushed-ice drink maker, etc.

Some prior art apparatuses for making and dispensing liquid or semi-liquid food products comprise two containers: a first container in which a first product is processed and made and a second container in which a second product is processed and made.

Preferably, these products can be made simultaneously.

Both the first and the second container are equipped with respective stirring units operating in such a way as to mix the respective liquid or semi-liquid products inside each container.

In machines of this kind, therefore, two types of products can be processed simultaneously: a first product in the first container and a second product in the second container.

Obviously, each product must be processed according to its specific and individual qualities.

Prior art apparatuses have two motors so that the two containers can process two different types of product, each with specific processing requirements typical of it and differing from those of the other product: a first motor is connected to the stirrer of the first container and a second motor is connected to the stirrer of the second container.

Moreover, such apparatuses usually have two thermal treatment systems which are independent of each other: a first system controls the first container and a second system controls the second container.

Clearly, machines of this kind are particularly expensive because they require two different high-power motors to process two different products simultaneously.

A need which is felt particularly strongly by operators in the trade is that of having an apparatus for simultaneously making two liquid or semi-liquid food products and which is particularly simple and inexpensive.

SUMMARY OF THE INVENTION

This invention therefore has for an aim to provide an apparatus and a method for making two liquid or semi-liquid food products simultaneously to allow meeting the above mentioned need.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a non-limiting example embodiment of the invention and in which:

DESCRIPTION OF THE PREFERRED EMBODIMENTS

Figure 1:
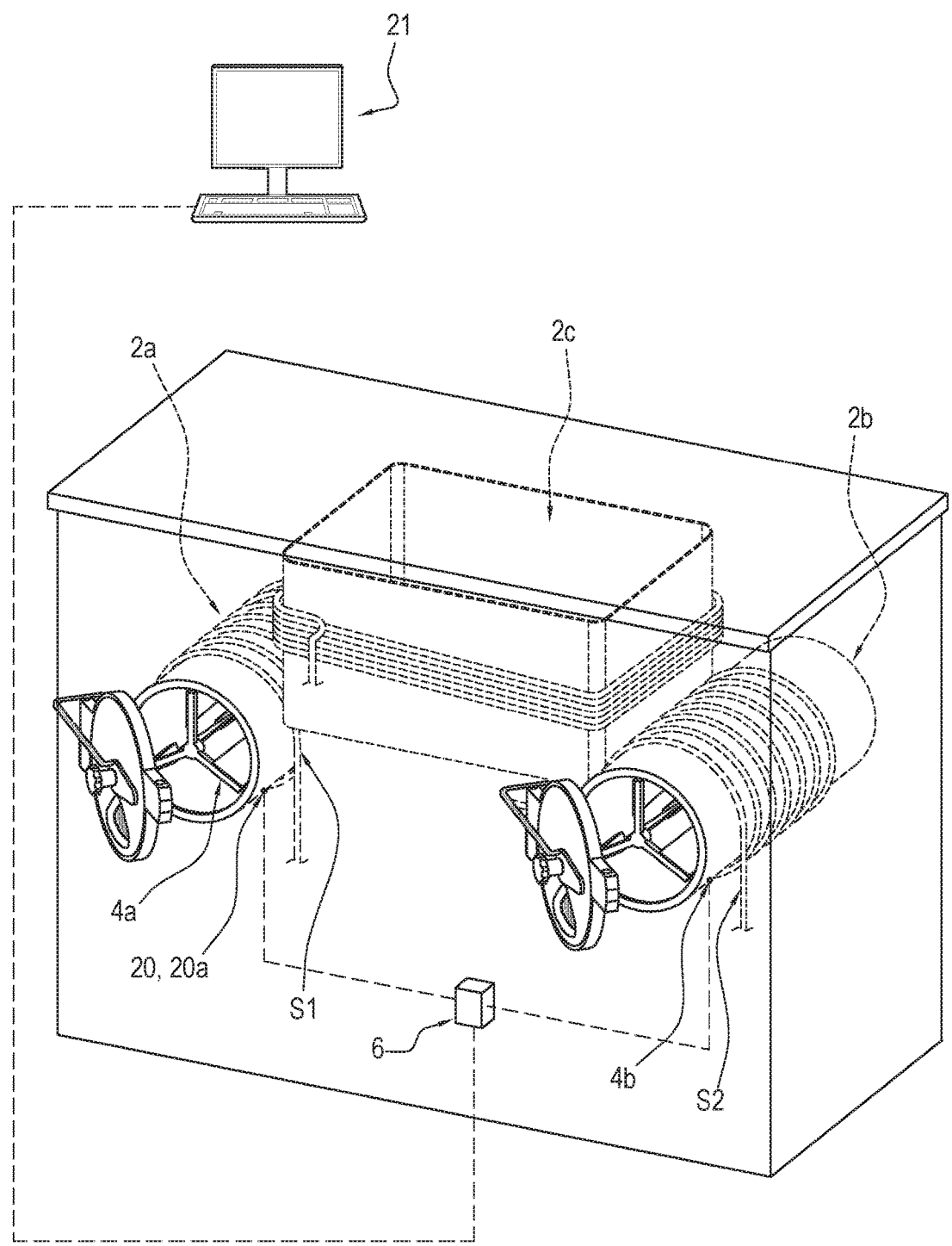
FIG. 1 is a perspective view of the apparatus for making and dispensing liquid or semi-liquid food products according to the invention.

With reference to the accompanying drawings, the numeral 1 denotes an apparatus or machine for making and dispensing liquid or semi-liquid food products according to this invention.

The apparatus 1 or machine 1 allows two different types of product such as, for example, ice cream. granitas, sorbets, yogurts, creams, etc., to be made simultaneously.

The machine thus allows simultaneous production of a first liquid or semi-liquid product and a second liquid or semi-liquid product, (the first and the second product are preferably different from each other).

The machine 1 comprises:

a first container 2a for containing ingredients constituting a first liquid or semi-liquid product;

a first stirrer 4a operating on the first container 2a for mixing the base ingredients and/or the first liquid or semi-liquid product;

a second container 2b for containing ingredients constituting a second liquid or semi-liquid product (usually different from the first base product);

a second stirrer 4b operating on the second container 2b for mixing the base ingredients and/or the second liquid or semi-liquid product;

a thermodynamic heat treatment system 10 comprising a circuit filled with a heat exchanger fluid, a compressor 7 operating in the circuit on the heat exchanger fluid, a first heat exchanger S1, affected by the heat exchanger fluid and associated with the first container 2a to exchange heat with the base ingredients or with the first product inside the first container 2a, a second heat exchanger S2 affected by the heat exchanger fluid and associated with the second container 2b to exchange heat with the base ingredients or the second product inside the second container 2b, a third heat exchanger S3 affected by the heat exchanger fluid, and at least one lamination unit 30 (defined by at least one valve or at least one narrowed portion of the circuit) operating on the heat exchanger fluid along the circuit.

According to the invention, the machine 1 further comprises:

first means M1 for adjusting the flow rate of the heat exchanger fluid along a first branch affected by the first heat exchanger S1 configured to allow adjustment of the thermal power exchanged (released) by the first heat exchanger S1;

second means M2 for adjusting the flow rate of the heat exchanger fluid along a second branch affected by the second heat exchanger S2 configured to allow adjustment of the thermal power exchanged (released) by the second heat exchanger S2.

It should be noted that the expression "means for adjusting the flow rate" is used to mean components which allow varying the flow rate (in continuous or step-by-step mode or of the ON-OFF type, that is to say, between two limit values, namely zero flow rate and maximum flow rate) of the heat exchanger fluid.

It should be noted that the first heat exchanger S1 and the second heat exchanger S2 are preferably mounted in parallel with each other relative to the compressor 7.

It should also be noted that the first heat exchanger S1 and the second heat exchanger S2 preferably define corresponding evaporators of the thermodynamic system 10 (mounted in parallel).

The third heat exchanger S3, on the other hand, preferably defines a condenser of the thermodynamic system 10.

Preferably, but not necessarily, the thermodynamic system 10 operates according to a compression refrigeration cycle.

It should be noted that the machine 1 further comprises: at least one sensor 20, configured to measure an operating parameter of the machine 1;

and a control unit 6, configured to control the first adjusting means M1 and the second adjusting means M2 as a function of the measured value of that operating parameter.

The expression "operating parameter" is used to mean any machine state or operating parameter which can be associated with processing (parameter relating to the state of components, ingredients and/or products).

Preferably, the operating parameter is a parameter relating to the state of the ingredients and/or of the products or, alternatively, a parameter relating to the state of the thermodynamic system (preferably the state of the heat exchanger fluid at one or more points of the system).

Preferably, the machine comprises at least two sensors, a first sensor configured to measure a first parameter relating to the processing of the first product and a second sensor configured to measure a second parameter relating to the processing of the second product.

The machine 1 preferably also comprises a user interface 21 configured to allow selecting a first operating program relating to the processing of the first product in the first container 2a, and to allow selecting a second operating program relating to the processing of the second product in the second container 2b.

According to this aspect, the control unit 6 is configured to allow adjusting the first adjusting means M1 and the second adjusting means M2 based on the first program and on the second program, respectively.

With reference to the first container 2a and/or to the second container 2b, it should be noted that the container (2a,2b) is preferably cylindrical in shape (preferably with a horizontal axis).

Preferably, the first heat exchanger S1 is associated with the side walls of the first container 2a.

Preferably, also, the second heat exchanger S2 is associated with the side walls of the second container 2b.

It should be noted that the first and second heat exchangers are preferably thermodynamic heat exchangers designed to allow heat to be exchanged with the heat exchanger fluid circulating in the thermal system.

With reference to the first stirrer 4a and/or the second stirrer 4b, it should be noted that, preferably but not necessarily, the first stirrer 4a and the second stirrer 4b are connected to a single motor (forming part of the machine) which drives both of them in rotation.

Preferably, the first stirrer 4a and the second stirrer 4b are driven in rotation simultaneously.

Still more preferably, the first stirrer 4a and the second stirrer 4b are driven in rotation at the same operating speed.

Figure 2:
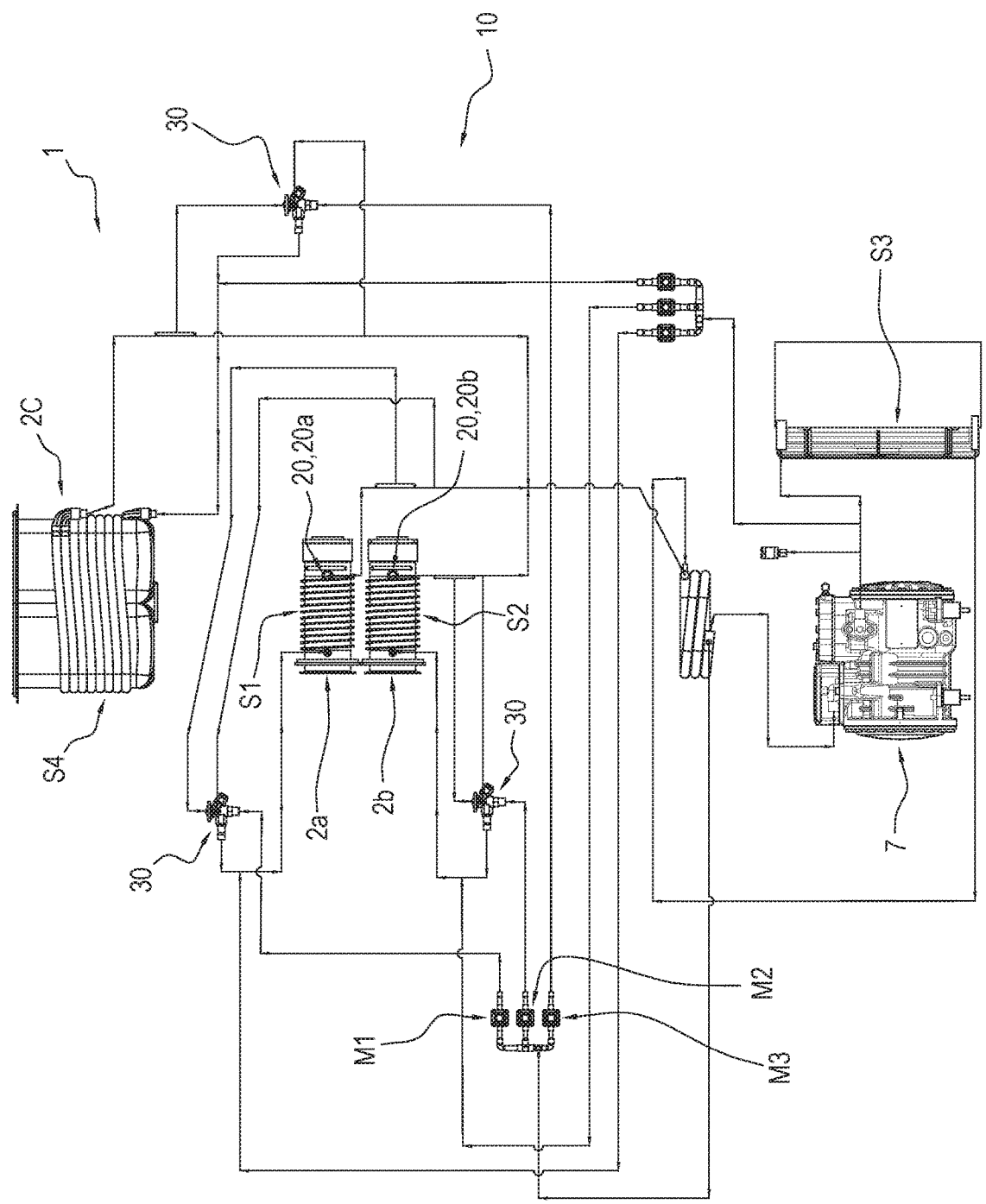
FIG. 2 shows a schematic view of the thermal treatment system of the machine of FIG. 1 according to a first embodiment of it.
Figure 3:
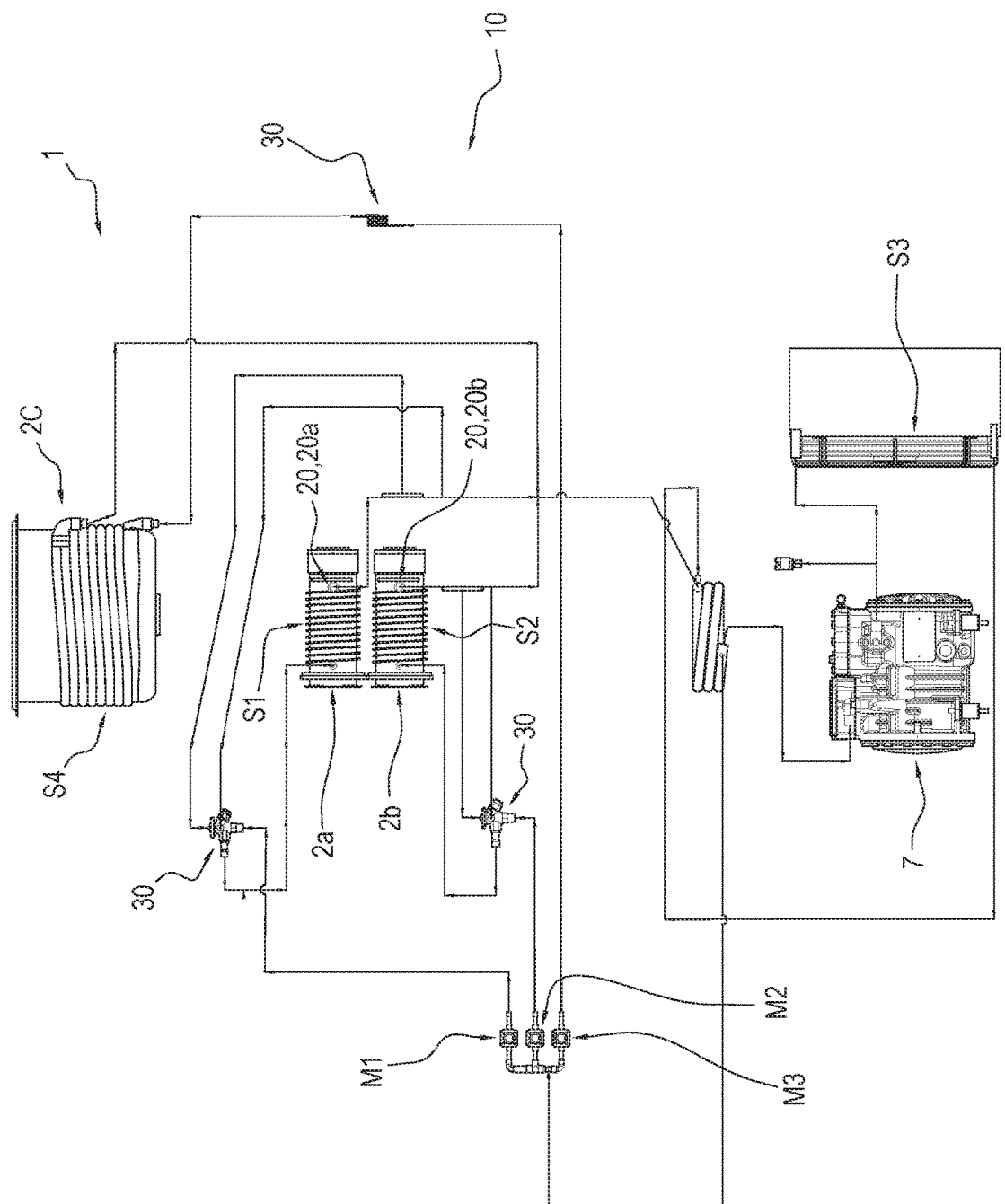
FIG. 3 shows a schematic view of the thermal treatment system of the machine of FIG. 1 according to a second embodiment of it.

In a first embodiment of the machine 1 (as illustrated in FIGS. 2 and 3), the machine 1 comprises at least a first sensor 20a associated with the first heat exchanger S1 to measure at least a first operating parameter relating to the first heat exchanger S1 and at least a second sensor 20b associated with the second heat exchanger S2 to measure at least a second operating parameter relating to the second heat exchanger S2.

According to this aspect, the control unit 6 is configured to control the first adjusting means M1 and the second adjusting means M2 based on the first and second operating parameters.

More precisely, the first sensor 20a is configured to measure a first temperature signal representing an outlet temperature of the heat exchanger fluid from the first heat exchanger S1 and the second sensor 20b is configured to measure a second temperature signal representing an outlet temperature of the heat exchanger fluid from the second heat exchanger S2.

According to this aspect, the control unit 6 is configured to control the first adjusting means M1 and the second adjusting means M2 based on the first and second measured values of the outlet temperature of the heat exchanger fluid from the respective heat exchangers (S1,S2).

Looking in more detail at the mode of controlling the machine 1, it may be noted that the control unit 6 is configured to:

compare the first and the second temperature signal, to establish which of the first and second signal has a greater value, indicating a higher outlet temperature of the respective heat exchanger (S1,S2);

and to control the first adjusting means M1 and the second adjusting means M2 so as to increase the flow rate in the branch associated with the heat exchanger whose temperature signal is higher, and reducing the flow rate in the branch associated with the heat exchanger with the lower temperature signal.

That way, advantageously, priority is given (that is, the heat exchanger fluid is delivered at a higher rate and thus generates higher thermal power) to the container where the heat exchange that is taking place is more intensive (that is, where the outlet temperature of the heat exchanger fluid is higher).

In this regard, it should be noted that the inlet temperatures of the first and second heat exchangers (S1,S2) are substantially the same.

More precisely, the control unit 6 is configured to control the first adjusting means M1 and the second adjusting means M2 based on comparisons between an upper threshold temperature value and the first and the second temperature signal, in order to calculate a first and a second temperature difference, respectively.

According to this aspect, the control unit 6 is configured to control the second adjusting means M2 so as to reduce the flow rate in the second branch (and increase that in the first branch) which the second heat exchanger S2 is associated with if the second difference is less than a predetermined value and to control the first adjusting means M1 so as to reduce the flow rate in the first branch (and increase that in the second branch), which the first exchanger S1 is associated with, if the first difference is less than a predetermined value.

According to another configuration and operating mode (not illustrated), the machine 1 comprises first sensors (two sensors) associated with the first heat exchanger S1 to measure first operating parameters relating to the first heat exchanger S1 and second sensors (two sensors) associated with the second heat exchanger S2 to measure second operating parameters relating to the second heat exchanger S2.

The first sensors are configured to measure an inlet temperature and an outlet temperature of the heat exchanger fluid of the first heat exchanger S1.

The second sensors, on the other hand, are configured to measure an inlet temperature and an outlet temperature of the heat exchanger fluid of the second heat exchanger S2.

According to this aspect, the control unit 6 is configured to control the first adjusting means M1 and the second adjusting means M2 based on the inlet and outlet temperatures of the heat exchanger fluid of the first heat exchanger S1 and on the inlet and outlet temperatures of the heat exchanger fluid of the second heat exchanger S2.

According to another operating mode, the machine 1 comprises a dispensing device, connected to the first container 2a and to the second container 2b.

The machine 1 is also provided with selectable commands to allow dispensing of the first product, the second product or a mixture of the first and second products, and the above-mentioned at least one sensor 20 is configured to detect the command selected, corresponding to the operating parameter of the machine.

The control unit 6 is configured to control the first adjusting means M1 and the second adjusting means M2 in such a way as to adjust the flow rate of the heat exchanger fluid in the first and in the second heat exchanger (S1,S2) as a function of the command selected.

More precisely, the control unit 6 can be configured to increase the flow rate of the refrigerant fluid in the first heat exchanger S1 if a command to dispense the first product is given or to increase the flow rate of the refrigerant fluid in the second heat exchanger S2 if a command to dispense the second product is given.

In effect, if product is drawn from one of the containers, either first or second (S1,S2), the container is topped up automatically by transferring product from the tank Under these circumstances, the product transferred into the container in order to top it up is at a higher temperature and thus the thermal power required for a specific process step is higher (and consequently the flow rate of the heat exchanger fluid must accordingly be higher).

In a further embodiment (not illustrated), the machine comprises at least a first sensor 20a associated with the first container 2a to measure a first operating parameter concerning a measurement of electrical impedance of the product inside the first container 2a and at least a second sensor 20b associated with the second container 2b to measure a second operating parameter concerning a measurement of electrical impedance of the product inside the second container 2b.

To measure the electrical impedance of the product, two electrodes are placed in electrical contact with the product and a variable (sinusoidal) electrical signal is applied thereto. Based on this electrical signal, the electrical impedance of the product is measured.

According to this aspect, the control unit 6 is configured to control the first adjusting means M1 and the second adjusting means M2 based on the first and second operating parameters of electrical impedance.

It should be noted that the sensors (20a,20b) are thus preferably mounted inside the respective containers (2a,2b).

Preferably, each sensor (20a,20b) comprises a pair of electrodes (preferably of metallic material).

Preferably, the operating parameter represents one or more of the following quantities:

modulus $|Z|$ of electrical impedance of the product;

argument $Arg(Z)$ of electrical impedance of the product.

In addition, or alternatively, the operating parameter may represent a difference $\Delta Arg(Z)$ between consecutive measurements of the argument $Arg(Z)$ of electrical impedance of the product inside the container (2a,2b).

In practice, the operating parameter may comprise a plurality of values, each representing a different quantity relating to the electrical impedance $Z$ of the product in the container (2a,2b).

Preferably, as will become clearer as this description continues, the impedance $Z$, represented by the operating parameter, has a non-zero imaginary part (reactive component).

Preferably, the machine 1 comprises a measuring module.

In the preferred embodiment, the measuring module is connected to the aforementioned electrodes.

The measuring module is preferably configured to pass a test signal through the product inside the container.

Preferably, the test signal is a voltage signal variable over time.

More specifically, the test signal has a non-zero frequency.

More specifically, the test signal is substantially periodical, preferably substantially sinusoidal.

Preferably, the test signal has a frequency of between 20 Hz and 10 KHz, preferably less than 300 Hz, and more specifically less than 100 Hz. By way of example, the test signal may have a frequency substantially equal to approximately 20 Hz.

Preferably, the test signal has an amplitude of between 50 mV and 150 mV, preferably between 80 mV and 120 mV, and more specifically between 95 mV and 105 mV. By way of example, the test signal may have an amplitude substantially equal to approximately 100 mV.

The measuring module thus measures a measurement signal in the product inside the container (2a,2b). The measurement signal is measured while the test signal passes through the product.

In practice, as mentioned, the test signal is a sinusoidal voltage signal.

The measurement signal preferably represents the current flowing in the product when the voltage of the test signal is applied.

The measuring module determines the aforementioned main parameter as a function of the measurement signal.

Preferably, the main parameter is determined also as a function of the test signal.

Preferably, the measuring module cooperates with the aforementioned electrodes to apply the test signal and to measure the corresponding measurement signal.

In a preferred embodiment, the measuring module may be embodied by an impedance analyzer to determine one or more of the aforementioned quantities $|Z|$, $Arg(Z)$, $\Delta Arg(Z)$ as a function of the test signal and of the measurement signal.

As mentioned, the imaginary part of the measured impedance $Z$ is a non-zero value.

More specifically, the test signal is generated in such a way as to be able to detect not only the purely resistive component of the mixture but also the reactive component.

The control unit 6 preferably receives the operating parameter sent by the sensor (2a,2b) and, more specifically, receives the operating parameter determined by the measuring module.

The control unit 6 compares the operating parameter received, relating to the electrical impedance, with at least one preset value.

The preset value may, for example, be a pre-calculated threshold value or a value determined as a function of previous measurements by the sensor (20a,20b).

In one embodiment, the preset value is a maximum threshold representing the value adopted by the electrical parameters of the product in the container (2a,2b) when the product reaches the desired consistency.

It should be noted that the consistency of the product (a parameter well known to experts in the trade) might be derived, advantageously and without limiting the invention, by measuring the current draw of the stirrer motor.

Advantageously, in this regard, the machine 1 might be equipped with a sensor configured to measure the current draw of the stirrer motor.

It should be noted that in this context, the measuring module and the control unit 6 are described as separate parts. They might, however, be made as a single electronic device suitably programmed and configured to perform the functions described.

In another embodiment, the first and second adjusting means (M1,M2) each consist of an electronic (expansion) valve.

It should be noted that the electronic valve substantially also fulfils the function performed by the thermostatic valve: thus, in this embodiment, there is no thermostatic valve and all its functions are performed by the electronic valve.

The electronic valve, therefore, allows adjusting the flow rate of the heat exchanger fluid in substantially continuous mode, between a minimum and a maximum value.

Thus, the machine 1 has a first electronic valve and a second electronic valve.

The control unit 6 is configured to send to each electronic expansion valve electrical control signals in order to adjust (in substantially continuous mode) the flow cross section of the valve itself (and hence the flow rate of the branch regulated by the valve itself.

Preferably, the electronic expansion valve is equipped with an electromechanical actuator such as, for example, a stepping motor, which gradually moves a shutter defining the flow cross section of the valve itself.

The control signals are thus conveniently addressed to the aforementioned electromechanical actuator.

The control unit 6 determines a first operating parameter representing the (instantaneous) overheating of the heat exchanger fluid flowing out of the first heat exchanger S1 and a second operating parameter representing the (instantaneous) overheating of the heat exchanger fluid flowing out of the second heat exchanger S2.

Preferably, the first operating parameter relating to overheating is determined as a function of a difference between the outlet temperature of the heat exchanger fluid from the first heat exchanger S1, and the outlet saturation temperature of the heat exchanger fluid from the selfsame first heat exchanger.

Similarly to what is described above, the second operating parameter relating to overheating is determined as a function of a difference between the outlet temperature of the heat exchanger fluid from the second heat exchanger S2, and the outlet saturation temperature of the heat exchanger fluid from the selfsame second heat exchanger.

In other terms, the following relation can be used:

$$SH = T_{out} - T_{sat},$$

where SH denotes overheating, Tout the outlet temperature from one of the heat exchangers (first or second) and Tsat the outlet saturation temperature from one of the heat exchangers (first or second).

The saturation temperature (relating to the first operating parameter) may advantageously be determined as a function of the outlet pressure of the fluid from the first heat exchanger S1.

The saturation temperature (relating to the second operating parameter) may advantageously be determined as a function of the outlet pressure of the fluid from the second heat exchanger S2.

It should be noted, therefore, that according to this aspect, the machine advantageously comprises first measuring sensors configured to allow determining the first operating parameter representing overheating at the first heat exchanger S1.

These first sensors comprise a pressure sensor adapted to measure a parameter representing the pressure of the heat exchanger fluid at the outlet from the first heat exchanger.

The measurement performed by the first pressure sensor can thus be used by the control unit 6 to calculate the saturation temperature.

Preferably, the first sensors also comprise a temperature sensor adapted to measure a parameter representing the outlet temperature of the fluid from the first heat exchanger.

This measurement can thus be used by the control unit 6 to calculate the main parameter SH representing overheating at the first heat exchanger S1 as stated above.

With reference to the second operating parameter representing the (instantaneous) overheating of the heat exchanger fluid flowing out of the second heat exchanger S2, it should be noted that the machine comprises second measuring sensors configured to allow determining the second operating parameter representing overheating at the second heat exchanger S2

These second sensors comprise a pressure sensor adapted to measure a parameter representing the pressure of the heat exchanger fluid at the outlet from the second heat exchanger S2.

The measurement performed by this pressure sensor can thus be used by the control unit 6 to calculate the saturation temperature.

Preferably, the second sensors also comprise a temperature sensor adapted to measure a parameter representing the outlet temperature of the fluid from the second heat exchanger.

It should be noted, therefore, that the control unit governs the first flow rate adjusting means M1 (first electronic valve) based on the first operating parameter calculated, and the second flow rate adjusting means M2 (second electronic valve) based on the second operating parameter calculated According to another aspect, the control unit 6 is configured to control the first adjusting means M1 and the second adjusting means M2 based on an algorithm, as described below.

Described below is the mode of controlling the first adjusting means M1. As regards the second adjusting means M2, the controlling mode is substantially the same.

TE denotes the inlet temperature of the heat exchanger fluid into the first heat exchanger S1, and TU denotes the outlet temperature of the heat exchanger fluid from the first heat exchanger S1.

According to this aspect, the machine comprises a sensor for measuring the heat exchanger fluid inlet temperature TE and a sensor for measuring the heat exchanger fluid outlet temperature.

The control unit 6 continuously receives the values of the heat exchanger fluid inlet temperature TE and outlet temperature TU of the first heat exchanger S1.

Using a suitable mathematical algorithm (integrated software), the control unit 6 processes the data received and, if necessary, acts on the controlled components (first and second adjusting means) in such a way as to guarantee optimum product processing independently of the time taken, which is, indirectly, a function of the particular type of mixture (rheological or apparent viscosity properties during the freezing process).

According to this aspect, the machine may comprise a hot gas injection circuit configured to allow injecting a modulated flow of hot gas for the entire duration of the product freezing step. The flow of hot gas injected through the solenoid valve passes through the first heat exchanger together with the normal flow of refrigerant to prevent the evaporation temperature dropping too fast and layers of ice forming on the inside surface of the first heat exchanger S1 by promoting maximum constant transfer of heat from the product to the heat exchanger fluid.

The operating algorithm, according to this mode, is described in patent IT 1334160 to the Applicant and incorporated herein by reference.

Alternatively, the operating algorithm implemented by the control unit 6 may be that described in patent IT1334137 to the Applicant and incorporated herein by reference.

More in general, it should be noted that the first adjusting means M1 and the second adjusting means M2 for adjusting the flow rate may be of the ON-OFF type, that is to say, configured to allow adjusting the flow rate between a zero value and a maximum value.

In yet another alternative embodiment, the first adjusting means M1 and the second adjusting means M2 for adjusting the flow rate are configured to allow adjusting the flow rate substantially continuously.

Further, it should be noted that the machine 1 preferably further comprises a third container 2c, adapted to allow thermally treating the base ingredients (which are then transferred to the first container 2a and/or to the second container 2b).

It should be noted that the third container 2c is preferably an open top tank.

Preferably, the third container 2c is in communication with the first container 2a and/or with the second container 2b.

Preferably, the third container 2c is equipped with a mixer.

It should be noted that the machine 1 preferably comprises third adjusting means M3 for adjusting the flow rate of the heat exchanger fluid in the third container 2c.

Also defined according to the invention is a method for simultaneously making a first liquid or semi-liquid product and a second liquid or semi-liquid product, comprising the following steps:
  preparing a first container 2a for containing liquid or semi-liquid base ingredients for making the first liquid or semi-liquid product;
  preparing a second container 2b for containing liquid or semi-liquid base ingredients for making the second liquid or semi-liquid product;
  preparing a thermodynamic heat treatment system comprising a circuit filled with a heat exchanger fluid, a compressor 7 operating in the circuit, a first heat exchanger S1 associated with the first container 2a, a second heat exchanger S2 associated with the second container 2b, a third heat exchanger S3 and a pressure reduction unit 30;
  stirring the liquid or semi-liquid base ingredients inside the first container 2a;
  stirring the liquid or semi-liquid base ingredients inside the second container 2b;
  measuring at least a first operating parameter relative to the processing of the first product and at least a second operating parameter relative to the processing of the second product;
  adjusting, as a function of the measured value of the first and second operating parameter, the quantity of heat exchanger fluid entering the first heat exchanger S1 and the second heat exchanger S2.

Preferably, the step of measuring at least a first operating parameter relative to the processing of the first product and at least a second operating parameter relative to the processing of the second product comprises a step of measuring an outlet temperature of the heat exchanger fluid from the first heat exchanger S1 and a step of measuring an outlet temperature of the heat exchanger fluid from the second heat exchanger S2.

Preferably, also, the step of adjusting, as a function of the measured value of the first and second operating parameter, the quantity of heat exchanger fluid entering the first heat exchanger S1 and the second heat exchanger S2 comprises the steps of:
  comparing the outlet temperature of the heat exchanger fluid from the first heat exchanger S1 with the outlet temperature of the heat exchanger fluid from the second heat exchanger S2;
  increasing the flow rate of heat exchanger fluid in the heat exchanger (S1,S2), between the first and the second heat exchanger, having an outlet temperature of the heat exchanger fluid which is higher, based on the comparison.

Preferably, the step of measuring at least a first operating parameter relative to the processing of the first product and at least a second operating parameter relative to the processing of the second product comprises a step of measuring an inlet temperature and an outlet temperature of the heat exchanger fluid from the first heat exchanger S1, to define the first operating parameter, and a step of measuring an inlet temperature and an outlet temperature of the heat exchanger fluid from the second heat exchanger S2, to define the second operating parameter.

Preferably, also, the step of adjusting, as a function of the measured value of the first and second operating parameter, the quantity of heat exchanger fluid entering the first heat exchanger S1 and the second heat exchanger S2 comprises a step of adjusting the flow rate between a zero value and a maximum value.

Advantageously, in the machine 1 it is possible to adjust the quantity of thermal power exchanged by the first heat exchanger S1 (operating on the first container) and by the second heat exchanger S2 (operating on the second container) based on the respective products being processed, according to the different methods described in the foregoing.

That way, although a single thermal treatment system is used, it is possible to process two different types of products simultaneously, unlike in the prior art, where the thermal systems were distinct and separate.

Advantageously, therefore, this machine uses fewer components, which translates as overall savings in costs, while still allowing optimal adjustment of the parameters and quantities affecting the processing of the two types of products.

In effect, it should be noted that the adjustment performed dynamically, that is, in real time, by the first means M1 and the second means M2, the thermal load of the two containers is correctly balanced at all times so as to allow optimum processing of the two (different) products.

According to another aspect, the control unit 6 is configured to control the first adjusting means M1 and the second adjusting means M2 in such a way as to adjust the flow rate of heat exchanger fluid in the first and in the second heat exchanger (S1,S2) as a function of the integral of the area between the inlet temperature and the outlet temperature of the first and second heat exchanger.

The integral of the area between the inlet temperature and the outlet temperature of the first and second heat exchanger constitutes a parameter representing the load (quantity of material) that is being mixed and frozen.

According to yet another aspect, the control unit 6 is configured to control the first adjusting means M1 and the second adjusting means M2 in such a way as to adjust the flow rate of heat exchanger fluid in the first and in the second heat exchanger (S1,S2) as a function of the derivative of the consistency of the product being processed.

According to yet another aspect, the control unit 6 is configured to control the first adjusting means M1 and the second adjusting means M2 in such a way as to adjust the flow rate of heat exchanger fluid in the first and in the second heat exchanger (S1,S2) as a function of the derivative of the consistency of the product being processed multiplied by the integral of the area between the inlet temperature and the outlet temperature of the first and second heat exchangers (that is to say, according to a combination of the preceding two aspects).

What is claimed is:

1. A machine for simultaneously making a first liquid or semi-liquid product and a second liquid or semi-liquid product, comprising:
    a first container for containing liquid or semi-liquid base ingredients constituting the first liquid or semi-liquid product;
    a first stirrer operating on the first container for mixing the liquid or semi-liquid base ingredients or the first liquid or semi-liquid product;
    a second container for containing liquid or semi-liquid base ingredients constituting the second liquid or semi-liquid product;
    a second stirrer operating on the second container for mixing the liquid or semi-liquid base ingredients or the second liquid or semi-liquid product;
    a thermodynamic heat treatment system comprising a circuit filled with a heat exchanger fluid, a compressor operating in the circuit on the heat exchanger fluid, a first heat exchanger, affected by the heat exchanger fluid and associated with the first container to exchange heat with the ingredients inside the first container, a second heat exchanger affected by the heat exchanger fluid and associated with the second container to exchange heat with the ingredients inside the second container, a third heat exchanger affected by the heat exchanger fluid, and a lamination unit operating on the heat exchanger fluid along the circuit;
    a first adjustment device including a first valve for adjusting a flow rate of the heat exchanger fluid along a first branch affected by the first heat exchanger configured to allow adjustment of a thermal power exchanged by the first heat exchanger;
    a second adjustment device including a second valve for adjusting the flow rate of the heat exchanger fluid along a second branch affected by the second heat exchanger configured to allow adjustment of the thermal power exchanged by the second heat exchanger;
    at least one sensor, configured to measure an operating parameter of the machine;
    and a control unit including a controller, configured to control the first adjustment device and the second adjustment device to adjust the flow rate of the heat exchanger fluid in the first heat exchanger and in the second heat exchanger as a function of the measured operating parameter of the machine;
    wherein the at least one sensor includes:
        at least one first sensor associated with the first heat exchanger and configured for measuring an outlet temperature of the heat exchanger fluid from the first heat exchanger and providing a first temperature signal representing the outlet temperature of the heat exchanger fluid from the first heat exchanger; and
        at least one second sensor associated with the second heat exchanger and configured for measuring an outlet temperature of the heat exchanger fluid from the second heat exchanger and providing a second temperature signal representing the outlet temperature of the heat exchanger fluid from the second heat exchanger;
    wherein the control unit is configured to control the first adjustment device and the second adjustment device on the basis of the first temperature signal and the second temperature signal;
    wherein the control unit is configured to control the first adjustment device and the second adjustment device to adjust the flow rate of the heat exchanger fluid in the first heat exchanger and in the second heat exchanger in a continuous manner.

2. The machine according to claim 1, wherein the control unit is configured for:
    comparing the first temperature signal and the second temperature signal, to establish which of the first temperature signal and the second temperature signal has a greater value, indicating a higher outlet temperature of the respective heat exchanger, and
    controlling the first adjustment device and the second adjustment device to increase the flow rate in the branch associated with the heat exchanger having the temperature signal with the greater value, and reducing the flow rate in the branch associated with the heat exchanger having the temperature signal with a lower value.

3. The machine according to claim 1, wherein the control unit is configured to control the first adjustment device and the second adjustment device based on comparisons between an upper threshold temperature value and the first temperature signal and the second temperature signal, for calculating, respectively, a first temperature difference and a second temperature difference, the control unit being configured for controlling the second adjustment device to reduce the flow rate in the second branch, if the second difference is less than a second predetermined value and to control the first adjustment device to reduce the flow rate in the first branch, if the first difference is less than a first predetermined value.

4. The machine according to claim 1, wherein the at least one first sensor comprises a sensor configured to measure an inlet temperature of the heat exchanger fluid from the first heat exchanger and the at least one second sensor comprises a sensor configured to measure an inlet temperature of the heat exchanger fluid from the second heat exchanger, and wherein the control unit is configured to control the first adjustment device and the second adjustment device on the basis of both the inlet temperature and the outlet temperature of the heat exchanger fluid from the first heat exchanger and both the inlet temperature and the outlet temperature of the heat exchanger fluid from the second heat exchanger.

5. The machine according to claim 1, wherein the first heat exchanger and the second heat exchanger are arranged in parallel along the circuit.

6. The machine according to claim 1, wherein the control unit is configured to adjust the flow rate of the heat exchanger fluid in the first heat exchanger and in the second heat exchanger fluid as a function of a dispensing commanded selected for dispensing from at least one chosen from the first container and the second container.

7. The machine according to claim 1, wherein the at least one first sensor includes a sensor associated with the first container for measuring an electrical impedance of the product or ingredients in the first container and the at least one second sensor includes a sensor associated with the second container for measuring an electrical impedance of the product or ingredients in the second container, and wherein the control unit is configured to control the first adjustment device and the second adjustment device based on the electrical impedance of the product or ingredients in the first container and on the electrical impedance of the product or ingredients in the second container.

8. The machine according to claim 1, wherein each of the first valve and the second valve is an electronic valve, configured to receive control signals.

9. The machine according to claim 1,
wherein the at least one first sensor includes a sensor configured for measuring a pressure of the heat exchanger fluid at an outlet from the first heat exchanger;
wherein the at least one second sensor includes a sensor configured for measuring a pressure of the heat exchanger fluid at an outlet from the second heat exchanger;
the control unit being configured to measure, on the basis of the measurements of the at least one first sensor and the at least one second sensor, a first parameter representing overheating of the heat exchanger fluid at the outlet from the first heat exchanger and a second parameter representing overheating of the heat exchanger fluid at the outlet from the second heat exchanger, and to control the first adjustment device and the second adjustment device based on the first parameter and the second parameter.

10. The machine according to claim 1, wherein the operating parameter represents a consistency of the product being processed.

11. The machine according to claim 1, wherein the operating parameter represents a derivative of a consistency of the product being processed.

12. The machine according to claim 1, wherein the control unit is configured to control the first adjustment device and the second adjustment device in such a way as to adjust the flow rate of the heat exchanger fluid in the first and in the second heat exchanger as a function of the integral of the area between the inlet temperature and the outlet temperature of the first and second heat exchangers, defining a parameter representing the load, that is, the quantity of product, which is being mixed.

13. The machine according to claim 1, wherein the control unit is configured to control the first adjustment device and the second adjustment device to adjust the flow rate of the heat exchanger fluid in the first heat exchanger and in the second heat exchanger as a function of a derivative of a consistency of the product being processed multiplied by an integral of an area between an inlet temperature and the outlet temperature of the first heat exchanger and the second heat exchanger.

14. A method for simultaneously making a first liquid or semi-liquid product and a second liquid or semi-liquid product, the first and second products being different from each other, comprising the following steps:
providing a first container for containing liquid or semi-liquid base ingredients for making the first liquid or semi-liquid product;
providing a second container for containing liquid or semi-liquid base ingredients for making the second liquid or semi-liquid product;
providing a thermodynamic heat treatment system comprising a circuit filled with a heat exchanger fluid, a compressor operating in the circuit, a first heat exchanger, affected by the heat exchanger fluid and associated with the first container to exchange heat with at least one chosen from the from the liquid or semi-liquid base ingredients and the first liquid or semi-liquid product inside the first container, a second heat exchanger, affected by the heat exchanger fluid and associated with the second container to exchange heat with at least one chosen from the liquid or semi-liquid base ingredients and the second liquid or semi-liquid product inside the second container, a third heat exchanger affected by the heat exchanger fluid, and a lamination unit operating on the heat exchanger fluid along the circuit;
providing:
a first adjustment device including a first valve for adjusting a flow rate of the heat exchanger fluid along a first branch affected by the first heat exchanger configured to allow adjustment of a thermal power exchanged by the first heat exchanger;
a second adjustment device including a second valve for adjusting the flow rate of the heat exchanger fluid along a second branch affected by the second heat exchanger configured to allow adjustment of the thermal power exchanged by the second heat exchanger;
at least one sensor, configured to measure an operating parameter of the machine;
and a control unit including a controller, configured to control the first adjustment device and the second adjustment device to adjust the flow rate of the heat exchanger fluid in the first heat exchanger and in the second heat exchanger as a function of the measured operating parameter of the machine;
wherein the at least one sensor includes:
at least one first sensor associated with the first heat exchanger and configured for measuring an outlet temperature of the heat exchanger fluid from the first heat exchanger and providing a first temperature signal representing the outlet temperature of the heat exchanger fluid from the first heat exchanger; and
at least one second sensor associated with the second heat exchanger and configured for measuring an outlet temperature of the heat exchanger fluid from the second heat exchanger and providing a second temperature signal representing the outlet temperature of the heat exchanger fluid from the second heat exchanger;
wherein the control unit is configured to control the first adjustment device and the second adjustment device on the basis of the first temperature signal and the second temperature signal;

wherein the control unit is configured to control the first adjustment device and the second adjustment device to adjust the flow rate of the heat exchanger fluid in the first heat exchanger and in the second heat exchanger in a continuous manner;

stirring the liquid or semi-liquid base ingredients inside the first container;

stirring the liquid or semi-liquid base ingredients inside the second container;

measuring:
- the outlet temperature of the heat exchanger fluid from the first heat exchanger and providing the first temperature signal representing the outlet temperature of the heat exchanger fluid from the first heat exchanger; and
- the outlet temperature of the heat exchanger fluid from the second heat exchanger and providing the second temperature signal representing the outlet temperature of the heat exchanger fluid from the second heat exchanger controlling the first adjustment device and the second adjustment device on the basis of the first temperature signal and the second temperature signal to adjust a quantity of heat exchanger fluid entering the first heat exchanger and the second heat exchanger.

15. The method according to claim 14, wherein the step of controlling the first adjustment device and the second adjustment device on the basis of the first temperature signal and the second temperature signal to adjust a quantity of heat exchanger fluid entering the first heat exchanger and the second heat exchanger, comprises the steps of:
- comparing the outlet temperature of the heat exchanger fluid from the first heat exchanger with the outlet temperature of the heat exchanger fluid from the second heat exchanger;
- increasing the flow rate of heat exchanger fluid in the heat exchanger, between the first and the second heat exchanger, having an outlet temperature of the heat exchanger fluid which is higher, based on the comparison.

16. The method according to claim 14, and further comprising measuring an inlet temperature of the heat exchanger fluid to the first heat exchanger and measuring an inlet temperature of the heat exchanger fluid to the second heat exchanger.

17. The method according to claim 14, wherein the step of adjusting the quantity of heat exchanger fluid entering the first heat exchanger and the second heat exchanger, comprises a step of adjusting the flow rate between zero and a maximum value.

* * * * *